United States Patent
Sochilin

(10) Patent No.: US 8,822,554 B2
(45) Date of Patent: Sep. 2, 2014

(54) AMINATED ION EXCHANGE RESINS AND PRODUCTION METHODS THEREOF

(71) Applicant: Brotech Corp., Bala Cynwyd, PA (US)

(72) Inventor: Vladimir Anatolievich Sochilin, Moscow (RU)

(73) Assignee: Purolite Corporation, Bala Cynwyd, PA (US)

( * ) Notice: Subject to any disclaimer, the term of this patent is extended or adjusted under 35 U.S.C. 154(b) by 43 days.

(21) Appl. No.: 13/625,201

(22) Filed: Sep. 24, 2012

(65) Prior Publication Data

US 2013/0085190 A1 Apr. 4, 2013

Related U.S. Application Data

(60) Provisional application No. 61/543,007, filed on Oct. 4, 2011.

(51) Int. Cl.
| | |
|---|---|
| *C08J 5/20* | (2006.01) |
| *B01J 41/14* | (2006.01) |
| *B01J 41/04* | (2006.01) |
| *B01J 49/00* | (2006.01) |
| *B01J 41/12* | (2006.01) |

(52) U.S. Cl.
CPC ............... *B01J 41/14* (2013.01); *B01J 41/043* (2013.01); *B01J 49/0073* (2013.01); *B01J 41/125* (2013.01); *B01J 41/046* (2013.01); *C08J 5/20* (2013.01)
USPC ..................... 521/32; 521/31; 521/36; 521/28

(58) Field of Classification Search
CPC .......... B01J 41/14; B01J 39/20; B01J 41/125; B01J 47/007; C08J 5/20; C08J 3/126; C08J 3/096; C08F 8/32
USPC .......................................... 521/32, 36, 31, 28
See application file for complete search history.

(56) References Cited

U.S. PATENT DOCUMENTS

| | | | |
|---|---|---|---|
| 4,225,677 A | | 9/1980 | Boutier et al. |
| 4,564,644 A | * | 1/1986 | Harris .............................. 521/28 |
| 4,785,020 A | | 11/1988 | Boom |
| 5,523,327 A | | 6/1996 | Song et al. |
| 6,667,349 B1 | | 12/2003 | Luetjens et al. |
| 8,686,055 B2 | | 4/2014 | Harris |

FOREIGN PATENT DOCUMENTS

| | | |
|---|---|---|
| EP | 0361685 | 4/1990 |
| EP | 0507467 | 10/1992 |
| EP | 361685 B1 * | 1/1994 |
| WO | WO 2004/011141 A1 * | 2/2004 |

OTHER PUBLICATIONS

E. Fries "Shell-core ion exchange resin developments", SCI Conference, University of Cambridge, UK, Sep. 2012.*
International Search Report and Written Opinion dated Mar. 11, 2013 for corresponding PCT Application No. PCT/US2012/057755.

* cited by examiner

*Primary Examiner* — Michael M Bernshteyn
(74) *Attorney, Agent, or Firm* — Fish & Richardson P.C.

(57) ABSTRACT

This invention relates to certain novel anion exchange resins and methods of making them. It relates more particularly to aminated cross-linked resin bead polymers containing an inert and/or chloromethylated core, and an aminated outer shell, and to methods for preparing the same. These resins exhibit improved anion exchange properties.

30 Claims, 6 Drawing Sheets

US 8,822,554 B2

AMINATED ION EXCHANGE RESINS AND PRODUCTION METHODS THEREOF

CROSS-REFERENCE TO RELATED APPLICATION

This application claims priority from U.S. Provisional Patent Application No. 61/543,007, filed Oct. 4, 2011, the contents of which are hereby incorporated by reference in its entirety.

FIELD OF THE INVENTION

The present invention relates generally to ion exchange resins and methods for preparing the same. In particular, the resins of the invention are anion exchange resins in bead form, the bead including an inert and/or chloromethylated core and an aminated outer shell. These resins offer efficient ion exchange and regeneration, providing high operating capacities, low leakages, reduced rinse water requirements, and improved resistance to organic fouling.

BACKGROUND OF THE INVENTION

Ion exchange resins are normally solid materials which generally carry exchangeable ions. Due to their ability to exchange ions in a liquid without substantial alteration of the solid resin's structure, they are widely used in recovery processes such as the removal of undesirable components from water and aqueous process streams.

Generally, the most effective ion exchange resins are substantially insoluble but swellable to a limited degree in water or organic solvents and are resistant to physical deterioration such as excessive swelling or shattering. Moreover, in many applications, particularly when employed in continuous operations such as water treatment, the ion exchange resin is advantageously regenerated to prolong the lifetime of its utility and to reduce operation costs.

Conventionally, ion exchange resins are prepared by (1) haloalkylating a copolymer of (a) a monovinylidene aromatic such as styrene and (b) a cross-linking agent which is generally a polyvinylidene aromatic such as divinylbenzene in the presence of a Friedel-Crafts catalyst and (2) attaching ion active exchange groups to the resulting haloalkylated polymer. For example, an anion exchange resin may be prepared by aminating the haloalkylated polymer. See, Ion Exchange by F. Helfferich, published in 1962 by McGraw-Hill Book Company, New York; see also U.S. Pat. Nos. 2,694,702; 4,093,567; 4,900,796; 5,278,193 and European Patent No. 101 943. Unfortunately, these standard anion exchange resins contain large bead structures (300-1200 microns) and possess low regeneration efficiency.

During the water deionizing process, ion exchange resins attract and bind minerals and trace elements in the raw water. For example, cation resins exchange positively charged particles such as sodium, calcium, magnesium, and radium, whereas anion exchange resins attract negatively charged components such as carbonate, sulphate, chloride, nitrate, arsenate, arsenite, and chromate. After continuous use, the resin's capacity is gradually exhausted and it is eventually no longer capable of deionizing. At this stage, the resin must be regenerated. Both cationic and anionic resins can be regenerated, e.g., with a salt solution such as sodium chloride. In the case of cationic resins, the sodium ion displaces the cation from the exchange site; and in the case of anion resins, the chloride ion displaces the anion from the exchange site. The salts used for regeneration are released into the soil or sewer. In industrial scale water ion exchange (e.g. softening) plants, the effluent flow from the regeneration process can precipitate scale that can interfere with sewerage systems.

In the regeneration step, the concentration of solution needed to drive regeneration increases as the impurities penetrate the resin bead. Conventional resins contain ionic groups uniformly distributed throughout the resin and are often left with un-regenerated cores, causing leakage of impurities during subsequent purification steps. Such resins accordingly require long rinse periods and high concentrations of regenerant solution to achieve regeneration throughout the entire bead (including the core of the bead) to meet industry requirements for purification.

Methods for increasing regeneration efficiency are known in the art. Such methods include, e.g., optimizing base and or salt dose, base or salt flow rate, flow direction, and reserve setting. In particular, it is common practice to use excess base and/or salt and regenerant solution to optimize regeneration efficiency. Unfortunately, however, excess reagents for regeneration increase operating costs and waste discharge. Regeneration efficiency is also commonly optimized by using narrow grade resins (with a uniformity coefficient of less than 1.4) and/or resins having a small particle size (typically less than 500 microns). However these special grade resins have significant pressure drop limitations and have limited economic applicability.

In view of the deficiencies in the prior art methods, it would be highly desirable to provide new polymer resins containing anion exchange groups which provide more efficient ion exchange and regeneration. Furthermore, it would be desirable to provide a new efficient process for preparing these resins.

SUMMARY OF THE INVENTION

An object of the invention is to provide at least a partial solution to the above-described problems and/or disadvantages in the prior art by providing anion exchange copolymer resins with improved regenerant utilization, higher capacities, and lower leakages. Surprisingly, it has been discovered that anion exchange resins with aminated functional groups only within the outer half of the resin, will improve the efficiency of regeneration by cutting the workload effort by 75%, thus reducing the need for excess regenerant.

Accordingly, one embodiment of the invention is directed to anion exchange resin beads having aminated functional groups and a matrix of a cross-linked polymer, wherein the concentration of aminated functional groups is lower in the core area relative to the shell area.

This invention also provides a process for preparing aminated anion exchange resins by:

providing chloromethylated copolymer intermediate resin beads containing a core area that is substantially free of chloromethyl functional groups; and aminating the chloromethylated copolymer intermediate to form an aminated anion exchange resin.

In another embodiment, the aminated anion exchange resin beads are prepared by:

providing chloromethylated copolymer intermediate resin beads;

aminating the chloromethylated copolymer intermediate to form an aminated anion exchange resin, wherein the concentration of aminated functional groups on the copolymer beads is lower in the core area relative to the shell area.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

Non-limiting and non-exhaustive embodiments of the present invention are described with reference to the following drawings. For a better understanding of the present invention, reference will be made to the following Detailed Description, which is to be read in association with the accompanying drawings, wherein.

DETAILED DESCRIPTION

Figure 1:
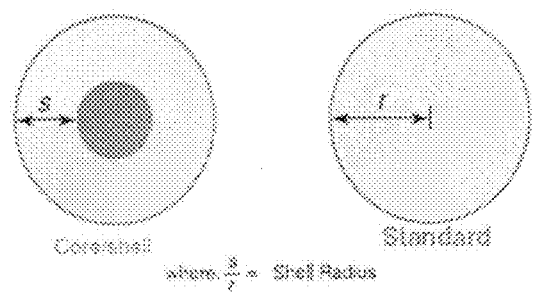
FIG. 1 is a schematic showing the "core/shell" morphology of resin beads of the invention.

It is understood that the invention(s) described herein is (are) not limited to the particular methodologies, protocols, and reagents described, as these may vary. It is also to be understood that the terminology used herein is for the purpose of describing particular embodiments only, and is not intended to limit the scope of the present invention. Unless defined otherwise, all technical and scientific terms used herein have the same meanings as commonly understood by one of ordinary skill in the art to which this invention belongs. Any methods and materials similar or equivalent to those described herein can be used in the practice or testing of the present invention.

All publications, including all patents, patent applications and other patent and non-patent publications cited or mentioned herein are incorporated herein by reference for at least the purposes that they are cited; including for example, for the disclosure or descriptions of methods of materials which may be used in the invention. Nothing herein is to be construed as an admission that a publication or other reference (including any reference cited in the "Background of the Invention" section alone) is prior art to the invention or that the invention is not entitled to antedate such disclosure, for example, by virtue of prior invention.

The skilled artisan will appreciate that the numerical values presented herein are approximate values. Generally, unless otherwise indicated, terms such as "about" and "approximately" include within 20% of the values indicated, more preferably within 10% and even more preferably within 5%.

It has been found that the ion exchange resin beads of the present invention are useful for the purification of boiler feed water, removal of salts from water systems, catalysis, hydrometallurgy, and inorganic reactions. In particular, these resins are useful for adsorbing, for example, organic matter, silica, colloidal silica, and ions having negative charges (such as $NO_3^-$, $PO_4^{2-}$, $SO_4^{2-}$) and releasing these ions readily during regeneration. These resins advantageously exhibit little or no ion leakage into the treated water.

The ion exchange beads of the present invention have a polymeric matrix. As used herein, the term "polymer matrix" is intended to include polymers and copolymers, particularly cross-linked copolymers. Products derived from such polymers, such as ion exchange resins, are referred to herein as "resins." The resins may be gellular, or may be macroporous as described in U.S. Pat. Nos. 4,192,921 and 4,582,859.

The resins of the invention are preferably aminated anion exchange resins bearing cationic groups useful for absorbing anions from water. Representative cationic moieties are derived from primary, secondary, tertiary, and quaternary amino groups; such as trimethylaminoethyl (TMAE), diethylaminoethyl (DEAE), dimethylaminoethyl (DMAE), aminophosphonic (S940), aminodiacetate (S930) and other polyamine groups such as the polyethyleneimine (PEI) that already have, or will have, a formal positive charge within the pH range of approximately 5 to approximately 9. Preferred aminated products may include strongly basic resins such as resinous quaternary ammonium bases or salts thereof, derived from trimethylamine or dimethylethanolamine. The aminiated products also include weakly basic resins of tertiary amines that are derived from secondary amines such as dimethyl amine.

The ion exchange beads of the invention also preferably contain a "core/shell" morphology. What is meant by the term "core/shell morphology" is that the degree of functionalization (e.g., amination) of the bead changes from the inside (core) to the outside (shell) of the bead. For example, the concentration of chemical functional groups on the core of the bead can be greater than or less than the concentration of functional groups on the shell. In a preferred embodiment of the invention, the concentration of functional groups on the core of the bead is less than the concentration of functional groups on the shell. In another preferred embodiment, the core of the resin is inert, containing no functional groups. In yet another preferred embodiment, the depth of the amination/functionalization is controlled by the depth of chloromethylation in the bead.

The core/shell resins of the invention advantageously contain a uniform shell on the outer portion of the resin beads, surrounding a generally spherical core. As shown in FIG. 1, the shell radius of the beads can be characterized in terms of an "S/R" ratio in which the "S" variable refers to the shell radius and "R" refers to the radius of a standard resin. As illustrated, a low S/R ratio (e.g., and S/R value of less than about 0.5) correlates with a resin shell of small depth whereas a large S/R ratio (e.g., greater than 0.8) relates to a deep shell resin. Useful S/R ratios of the invention include, but are not limited to, S/R values less than about 1.00, with values of about 0.99, 0.95, 0.85, 0.75, 0.70, 0.65, 0.60, 0.55, 0.50, 0.45, 0.40, 0.35, 0.30, 0.25, 0.20, 0.15, being preferred. In another embodiment, S/R values of 0.50 to 0.95 and 0.6 to 0.8 are preferred. In yet another embodiment, S/R values of less than 0.9 or less than 0.75 are preferred.

The "core/shell" resins described herein offer greater efficiency of regeneration than conventional resins due to the inert core of the resin, and are thus preferred in some embodiments of the present invention. These resins eliminate the ions that otherwise accumulate deep within the beads of conventional resins since these resins do not have an amine-functionalized core area. The spherical beads are functionalized only at the surface of the resin with aminated functional groups with a reduced depth of penetration which allows for a more complete regeneration and provides a higher, more efficient utilization of the regenerant. These resins have high salt efficiency, lower leakage, and reduced rinse water requirements when compared to conventional softening resins.

The aminated core/shell resins of the invention are advantageously prepared by chloromethylating a resinous polymer matrix and reacting the chloromethylated intermediate with an amine to form the aminated product.

The resinous polymer matrix used in the present invention may represent a wide range of substrates. In some embodiments, the resinous polymers include those described in F. Helfferich, ION EXCHANGE (McGraw Hill Book Co. 1962), which is hereby incorporated by reference in its entirety. The resinous polymer matrix of the invention is intended to include both naturally occurring and synthetic polymers and, accordingly, to include natural and synthetic polymers such as polyolefins, polyamides and other synthetic resins, oligomers, graft polymers, block copolymers, terpolymers, branched polymers, thermoplastic blends and mixtures thereof. Examples of suitable resinous polymers that may be employed in the instant invention include polycarbonates, polystyrene, polyethylene ether, polyphenylene ethers, polyetherimides, polyesters including polyethylene terephthalate and polybutylene terephthalate.

The resinous polymer substrate may be prepared by any method known to those of ordinary skill in the art. In some embodiments of the invention, the resinous polymer substrate is prepared by suspension polymerization. In this embodiment, an aqueous phase containing a suspension stabilizer is combined in a reactor with a solution of at least one polymerizable monomer, a crosslinking agent and a polymerization initiator. The suspension is then reacted under appropriate conditions to afford the desired polymerization product. In general, the polymerization reaction is carried out using conventional conditions, at a temperature of from 50 to 90° C. for 2 to 8 hours. In the present invention, the polymerization temperature need not be kept constant throughout the reaction; it may be raised at any desired rate in accordance with the progress of the polymerization reaction. Preferred temperature values for the polymerization reaction include temperatures of about 55, 60, 65, 70, 71, 72, 73, 74, 75, 76, 77, 78, 79, 80, 81, 82, 83, 84, 85, 86, 87, 88, 89, or 90° C. One preferred temperature range for the polymerization reaction is about 75 to 80° C. Preferred reaction times for the polymerization reaction include, but are not limited to, time periods of about 2, 2.5, 3, 3.5, 4, 4.5, 5, 5.5, 6, 6.5, 7, 7.5, 8, 8.5, 9, 9.5, or 10 hours. A preferred reaction time includes time periods of about 4 to 6 hours.

Suspension stabilizers (also referred to as dispersants or surfactants) may include water-soluble polymers and water-insoluble organic compounds. Water-soluble polymers of the invention include poly(vinylalcohol), hydroxypropyl cellulose, sodium poly(styrene sulfonate), and sodium salt of acrylic acid-acrylate ester copolymer; water-insoluble organic stabilizers include talc, hydroxyapatite, barium sulfate, kaolin, magnesium carbonate and hydroxide, calcium phosphate, and aluminum hydroxide. In some embodiments of the invention, poly(vinylalcohol) is a preferred suspension stabilizer. The levels of suspension stabilizers are typically less than 1.0 weight percent of the aqueous phase, or less than about 0.9, 0.8, 0.7, 0.6, 0.5, 0.4, 0.3, 0.2, or 0.1 weight percent of the aqueous phase. Optional additives such as sodium nitrite may also be added to the aqueous phase to prevent emulsion polymerization.

As used herein, the term "monomer" is defined as a molecule of simple structure and low molecular weight that is capable of combining with a number of like or unlike molecules to form a polymer. Examples include, but are not limited to, simple acrylate molecules, for example, hexanedioldiacrylate, or tetraethyleneglycoldiacrylate, vinylaromatic compounds such as styrene, methyl styrene, and combinations thereof. The molecular weight of the monomers is generally less than 1000, while for fluorinated monomers, it is generally less than 2000. In a preferred embodiment of the invention, the monomer for polymerization is a vinylaromatic monomer such as styrene. Substituted styrenes, such as 4-methylstyrene or 4-chlorostyrene are also preferred. In one embodiment of the invention, non-aromatic co-monomers may also be utilized in amounts below about 20%, such as (meth)acrylic esters of alcohols or polyols and (meth)acrylonitrile.

The monomers may be polymerized using water soluble radical polymerization initiators, ultraviolet rays, high-energy radiation or other means, which may be applied alone or in combination. The radical initiators used in the present invention may include, for example, inorganic or organic peroxides such as persulfates, hydrogen peroxide, di-tert-butyl peroxide, and acetyl peroxide, azo compounds, and other initiators such as 2,2'-azobis(2-amidinopropane)dihydrochloride. Preferred radical polymerization inhibitors include peroxides such as tert-butyl-peroxo-2-ethylhexanoate.

The polymerization reaction can be initiated by decomposing the radical initiator. This may be accomplished by heating the initiator or treating it with a chemical substance. For example, reducing compounds such as acidic sulfites, ascorbic acids, and amines can be used in combination with the initiators to start the polymerization reaction. Polymerization initiators comprising combinations of peroxides with reducing compounds may also be used. The polymerization initiators are preferably used in an amount of from 0.001 to 10 percent by weight, preferably in a range of 0.1 to 5% by weight, relative to the monomers.

In one embodiment of the invention, the resinous polymers are cross-linked copolymers. Crosslinking is generally accomplished with a multifunctional monomer which may be a single chemical compound or a mixture of compounds, and may be exemplified by, but not limited to, the following illustrative materials: divinylbenzene, divinylpyridine, divinylnaphthalenes, diallyl phthalate, ethylene glycol diacrylate, ethylene glycol dimethacrylate, trimethylol propane trimethacrylate, divinyl sulfone, polyvinyl or polyallyl ethers of glycol, glycerol, pentaerythritol, diethylene glycol, monothio- or dithio-derivatives of glycols, and of resorcinol, divinyl ketone, divinyl sulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl carballylate, triallyl aconitate, triallyl citrate, triallyl phosphate, N,N'-methyleneacrylamide, N,N'-methylenedimethacrylamide, N,N'-ethylenediacrylamide, triyinylbenzene, triyinylnaphthalenes, and polyvinylanthracines.

Examples of preferred crosslinking agents includes divinylbenzene, divinylpyridine, divinylnaphthalenes, triyinylbenzene, alkyl divinylbenzenes having from 1 to 4 alkyl groups of 1 to 2 carbon atoms substituted in the benzene nucleus, and alkyl trivinylbenzenes having 1 to 3 alkyl groups of 1 to 2 carbon atoms substituted in the benzene nucleus. In one preferred embodiment of the invention, the crosslinking agent is divinylbenzene. Depending on the extent of crosslinking and porosity desired, either commercial divinylbenzene, which is about 55% divinylbenzene with most of the remainder being ethylvinylbenzene, or a higher purity grade (about 80% divinylbenzene) may be chosen. Cross-linking can vary from about 1.5 to 10% divinylbenzene, preferred cross-linking can vary from about 4 to 6%, or about 4.0, 4.5, 5.0, 5.5, and 6.0%.

In the chloromethylation step, the resinous polymer beads are activated with a reagent such as a chloromethyl ether to form a covalent chloride intermediate. For example, a preferred process for chloromethylation employs reaction of an externally or separately prepared chloromethylating agent (e.g., chloromethyl methyl ether) with the polymer, which introduces the chloromethyl groups and produces methanol and other by-products. Excess chloromethylating agent remaining after the chloromethylation reaction is complete is deactivated or quenched and the polymer is then further reacted to form the desired anion exchange resin. The chloromethylation reaction may also be accomplished "in situ," as described in U.S. Pat. No. 4,225,677. In the in situ procedure, the chloromethyl methyl ether is generated from chloromethylating complexes, such as, from a mixture of methanol, formaldehyde and chlorosulfonic acid, in the presence of, or with subsequent addition of resin and catalyst.

Chloromethylating agents useful in this invention include chloromethyl alkyl ethers. Preferred chloromethyl alkyl ethers correspond to the formula $ClCH_2OR$ wherein R is $C_{1-10}$ alkyl or $C_{3-10}$ haloalkyl. Examples of chloromethyl alkyl ethers useful in this invention include chloromethyl methyl ether, chloromethyl ethyl ether, chloromethyl propyl ether, chloromethyl butyl ether, and 1-chloromethoxy-4-chlorobutane. In one preferred embodiment of the invention, the chloromethyl alkyl ether is chloromethyl methyl ether. The amount of chloromethylating agent which may be used is the amount which results in the desired yield of the chloromethylated aromatic product. Preferably, a mole ratio of 2:1 or greater of the chloromethylating agent is used. Preferably, the mole ratio of chloromethylating agent to polymer resin is between about 0.1:1 and 6:1, and most preferably between about 2:1 and 4:1. At a mole ratio higher than 6:1, the reaction becomes uneconomical, whereas below a mole ratio of 1:1, the reaction proceeds very slowly, and may not go to completion.

Additional solvents (such as ethylene dichloride) which swell the polymer beads and affect the diffusion of chloromethyl methyl ether may be present, but it is preferred to use chloromethyl methyl ether as solvent and reactant, to minimize distillation and condensation of additional material. This process may also be performed in an inert reaction medium. Inert reaction media include, but are not limited to carbon disulfide, chlorinated aliphatic hydrocarbons and aliphatic hydrocarbons. Examples of inert reaction media include methylene chloride, carbon tetrachloride, chloroform, perchloroethylene, 1,2-dichloroethane, ligroin or carbon disulfide. The reagent dimethoxymethane (or methylal) may also be added to the reaction. Dimethoxymethane has been found useful in aiding in the extraction of chloromethylmethyl ether imbibed in the resin. This compound may also be used as an alternative to methanol and formaldehyde. Methylated formalin or "formcel" may be substituted for formaldehyde and methanol in appropriate proportions.

Catalysis of the chloromethylation may be accomplished by a variety of Lewis or Bronsted acids, such as aluminum chloride ($AlCl_3$), zinc chloride ($ZnCl_2$), iron (III) chloride ($FeCl_3$), titanium tetrachloride ($TiCl_4$), zinc oxide (ZnO), iron (III) oxide ($Fe_2O_3$), zirconium (IV) chloride ($ZrCl_4$), tin (IV) chloride ($SnCl_4$), and sulfuric acid ($H_2SO_4$). Mixtures of catalysts may also be used, as may catalyst adjuncts, such as calcium chloride, and activating agents, such as silicon tetrachloride. Preferred catalysts include aluminum chloride, zinc chloride, iron (III) chloride, and iron (III) oxide. In one preferred embodiment of the invention, the catalyst is iron (III) chloride. The amount of catalyst used will range from about 0.005 equivalents to about 2.0 equivalents. It is preferred to utilize from about 0.05 to about 0.70 equivalents. It is particularly preferred to utilize from about 0.10 to about 0.40 equivalents with the preferred catalysts.

The chloromethylation reaction may also be carried out in the presence of a reaction promoter. As used herein, the term "reaction promoter" refers to compounds which increase the yield and rate of reaction when present. Preferred reaction promoters include thionyl chloride ($SOCl_2$), silicon tetrachloride ($SiCl_4$), titanium tetrachloride ($TiCl_4$), phosphorus trichloride ($PCl_3$), sulfuryl chloride ($SO_2Cl_2$), phosphorus pentachloride ($PCl_5$) and chlorosulfonic acid ($ClSO_3H$). In one embodiment of the invention, the reaction promoters include thionyl chloride, silicon tetrachloride, titaniumtetrachloride, phosphorus trichloride and sulfuryl chloride. In another embodiment, the reaction promoters include thionyl chloride and phosphorus trichloride, with thionyl chloride being the most preferred. The reaction promoter is an optional ingredient, and may be used in amounts which result in enhanced yields of the desired product. In one preferred embodiment of the invention, between about 10 and 100 mole percent of the promoter may be used, or between about 10 and 80 mole percent, or between about 20 and 40 mole percent. In those embodiments where no reaction promoter is used, a larger amount of catalyst may be required.

It has been found that resinous polymers and copolymers can be chloromethylated so as to obtain polymeric products containing reactive chloromethyl radicals bound to sites in the shell of the polymer beads. In particular, the rate of diffusion of the chloromethylating agent in the polymer bead can be controlled by modulating reaction conditions so that chloromethylation only occurs in the shell of the bead. Preferred reaction conditions include temperatures of from about −10° C. to about 60° C. for about 1 to about 8 hours. The ratio of chloromethylating agent to resin is from about 2 to at least about 20. The best combination of reactivity and resin swelling is achieved when the ratio is from about 4 to about 9. Preferred temperatures include temperatures between about −10° C. and 40° C., or between about 10° C. and 20° C., or between about 10° C. and 15° C.

The chlormethylated polymers prepared by the present invention have a large number of uses when converted to aminated anion exchange resins. The chloromethylated intermediate, after separation from the chloromethyl ether reaction mixture and purification to remove traces of the chloromethyl ether, may be converted to a weak base resin by reaction with dimethyl amine. The weak base resin may be further converted to a strong base resin by quaternization with methyl chloride. The chloromethylated intermediates may be converted to strong base resins by direct reaction with a trialkyl amine, such as trimethyl amine.

In one embodiment of the invention, the core/shell structure is obtained by aminating a fully functionalized chloromethylated resin bead in water without organic solvents to form an aminated functionalized shell and an a chloromethylated core. Without being bound by theory, it is thought that carrying out the reaction in water instead of organic solvents slows down the rate of diffusion and permits amination only at the outer shell of the polymer beads. In addition, the absence of swelling solvents reduces the diffusion rate of the amination agent and thus prevents it from reaching and activating the chloromethylated core. In this embodiment, the rate of diffusion of the aminating agent inside of the chloromethylated bead is also partially controlled by modulating the reaction conditions. For example, functionalization of the shell is advantageously achieved by controlling the temperature and concentration of the aminating agent. Preferred temperatures for the amination reaction include temperatures in the range of from about 30 to about 60° C., or about 35, 36, 37, 38, 39, 40, 41, 42, 43, 44, 45, 46, 47, 48, 49, or 50° C. Particularly preferred temperatures for the amination step include 40, 41, 42, 43, 44, and 45° C. The ratio of aminating agent to resin is from about 0.1 to at least about 2.0. In some embodiments, the best combination of reactivity and resin swelling is achieved when the ratio is from about 1.0 to about 1.5.

The S/R ratio of the aminated product can be at least partially controlled by modulating reaction time and/or the concentration of the aminating agent. Preferred reaction times include time periods of about 15 minutes to 48 hours, or about 0.5, 1, 2, 3, 4, 5, 6, 7, or 8 hours. In some embodiments, the preferred S/R ratios of the aminated product are achieved when the ratio of aminating agent to resin is from about 0.1 to at least about 2.0, or from about 1.0 to about 1.5.

The following examples serve to more fully describe the manner of using the above-described invention, as well as to set forth the best modes contemplated for carrying out various aspects of the invention. It is understood that these examples in no way serve to limit the true scope of the invention, but rather are presented for illustrative purposes.

Reagents for chemical synthesis may be purchased from commercial sources. For example, in the experiments described below, styrene was obtained from Nizhnekamsk (Russian Federation), divinylbenzene was purchased from Atofina (Belgium), tert-butyl peroxy-2-ethylhexanoate (TB-PEH) was purchased from Akzo Nobel, and polyvinyl alcohol (Mowiol® 40-88) was purchased from Clariant (Germany). Other chemicals described in the experiments below, including ethylenedichloride, paraformaldehyde, methanol, dimethoxymethane, chlorosulfonic acid, trimethylamine, chloromethyl methyl ether, iron(III)chloride, and sodium nitrate were purchased from Sigma-Aldrich. The filtration system and associated reagents were also obtained from Sigma-Aldrich.

Example 1

A monomer phase containing styrene (760 g), divinylbenzene 80% (40 g), and tert-butylperoxo-2-ethylhexanoate (3.2 g) was filtered over a polytetrafluoroethylene filter (0.2 μm) and added to a reactor equipped with an agitator. An aqueous phase containing deionized water (1000 mL), polyvinylalcohol (Mowiol® 40-88) (10 g), and sodium nitrite (0.05 g) was then added to the reactor, and the reaction mixture was heated to 78° C. and maintained for 4.5 hours. The temperature was then increased to 90° C. for 1 hour. The copolymer beads contained about 4.0% cross-linked divinylbenzene based on the total copolymer weight.

A solution of paraformaldehyde (113 g), methanol (158 mL) and iron(III)chloride 40% (47 mL) was added to a 1 L reactor. Chlorosulfonic acid (221 mL) was added slowly to the suspension at a temperature below 38° C. The reactor was then cooled to 13-14° C., and a 150 g portion of the copolymer beads (4% DVB gel, fraction 250-630 μm) were added. The mixture was stirred at 15° C. for 4 hours and 40 minutes. Methanol (300 mL) was slowly added to the suspension at a temperature of 20-22° C. to quench the reaction. The chloromethylated beads were then washed over a glass filter with methanol (4-5×500 mL).

The chloromethylated beads were then charged with dimethoxymethane (400 mL) in a 1 L reactor and stirred for 20 minutes at room temperature. Trimethylamine 50% (180 mL) was added to the mixture and the suspension was incubated for 2 hours at 40° C. The reaction was then heated to 80° C. and supplemented with water to remove the dimethoxymethane by distillation. The reaction was cooled to 30-35° C. and concentrated HCl (~50 mL) was added drop wise. The aminated resin was rinsed with water and isolated over a glass filter. The reaction yield was 640 mL of isolated resin having a swelling factor of 4.3 and an S/R ratio of 0.61. The properties of the isolated beads are shown in Table 1 below.

Figure 2:
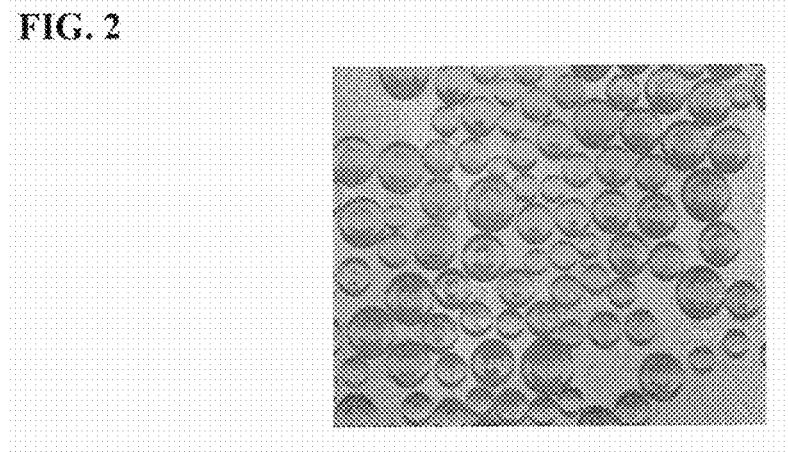
FIG. 2 is a microscope image showing the functionalized copolymer beads obtained in Example 1. As shown, the functionalized beads contain distinct shell and core regions.

FIG. 2 is an image of the amine functionalized copolymer beads obtained in Example 1. A clear border is shown between the inert non-activated core and the functionalized shell area. The bead diameter of the copolymer beads prepared in Example 1 is approximately 500 microns.

Example 2

A monomer phase containing styrene (785 g), divinylbenzene 80% (15 g), and tert-butylperoxo-2-ethylhexanoate (4.8 g) was filtered over a polytetrafluoroethylene filter (0.2 μm) and added to a reactor equipped with an agitator. An aqueous phase containing deionized water (1000 mL), polyvinylalcohol (Mowiol® 40-88) (10 g), and sodium nitrite (0.05 g) was then added to the reactor, and the reaction mixture was heated to 81° C. and maintained for 4.5 hours. The temperature was then increased to 90° C. for 1 hour. The copolymer beads contained about 1.5% copolymerized divinylbenzene.

A solution of paraformaldehyde (113 g), methanol (158 mL) and iron (III) chloride 40% (25 mL) was added to a 1 L reactor. Chlorosulfonic acid (221 mL) was added slowly to the suspension at a temperature below 38° C. The reactor was then cooled to 5-7° C., and an 80 g portion of the copolymer beads (1.5% DVB gel) were added. The mixture was stirred at 12° C. for 2.5 hours. Methanol (300 mL) was slowly added to the suspension at a temperature of 20-22° C. to quench the reaction. The chloromethylated beads were then washed over a glass filter with methanol (4-5×500 mL).

The chloromethylated beads were then charged with dimethoxymethane (400 mL) in a 1 L reactor and stirred for 20 minutes at room temperature. Trimethylamine 50% (100 mL) was added to the mixture and the suspension was incubated for 2 hours at 40° C. The reaction was then heated to 80° C. and supplemented with water to remove the dimethoxymethane by distillation. The reaction was cooled to 30-35° C. and concentrated HCl (~50 mL) was added drop wise. The aminated resin was rinsed with water and isolated over a glass filter. The reaction yield was 470 mL of isolated resin having a swelling factor of 5.9 and an S/R ratio of 0.52.

Example 3

A monomer phase containing styrene (760 g), divinylbenzene 80% (40 g), and tert-butylperoxo-2-ethylhexanoate (3.2 g) was filtered over a polytetrafluoroethylene filter (0.2 μm) and added to a reactor equipped with an agitator. An aqueous phase containing deionized water (1000 mL), polyvinylalcohol (Mowiol® 40-88) (10 g), and sodium nitrite (0.05 g) was then added to the reactor, and the reaction mixture was heated to 78° C. and maintained for 4.5 hours. The temperature was then increased to 90° C. for 1 hour. The copolymer beads contain about 4.0% cross-linked divinylbenzene based on the total copolymer weight.

Chloromethyl methyl ether (125 mL), 90% sulfuric acid (320 mL) was added to a 1 L reactor. 40% iron (III) chloride (47 mL) was then introduced slowly to the suspension at a temperature below 35° C. The reactor was then cooled to 13-14° C., and a 150 g portion of the copolymer beads (4%

DVB gel, fraction 250-630 µm copolymer) was added. The mixture was stirred at 15° C. for 3 hours and 40 minutes. Methanol (300 mL) was slowly added to the suspension at a temperature of 20-22° C. to quench the reaction. The chloromethylated beads were then washed over a glass filter with methanol (4-5×500 mL).

The chloromethylated beads were then charged with dimethoxymethane (400 mL) in a 1 L reactor and stirred for 20 minutes at room temperature. Trimethylamine 50% (180 mL) was added to the mixture and the suspension was incubated for 2 hours at 40° C. The reaction was then heated to 80° C. and supplemented with water to remove the dimethoxymethane by distillation. The reaction was cooled to 30-35° C. and concentrated HCl (~50 mL) was added drop wise. The aminated resin was rinsed with water and isolated over a glass filter. The reaction yield was 585 mL of isolated resin having a swelling factor of 3.9 and an S/R ratio of 0.51.

The properties of the isolated beads are shown in Table 1. The S/R ratio (indicated by the S/R (microscope) values in Table 1) were determined by analyzing microscopic images of the resins beads. Specifically, the shell and bead diameters were measured for about 100 randomly selected beads from a resin sample to determine the average S/R ratio of beads in the sample. The S/R (moisture) values were obtained by measuring the S/R ratios of bead samples fully swollen in water. The total capacity of the resins was measured using standard analytical methods to determine the full extent of functional groups available for exchange as reported in unit weight of dry resin (S/R (wt. cap.) values) or in unit volume of wet resin (S/R (vol. cap.) values). Bead appearance values were determined by analyzing sample images from a stereo microscope with magnification between 20× and 40×. A sample of 500-1000 beads was dispersed into a monolayer and the percent cracks, pieces, and misshaped beads (C-P-M) in the sample were recorded. The sample density was measured by weighing a specified volume of dry resin beads to determine a bulk density in g/mL. The uniformity coefficient was determined by dividing the sieve diameter which permits passage of 60% of the resin beads in a sample by the sieve diameter which allows passage of 10% of the beads. The resin's capacity for chemically bound moisture (% Moisture) was determined by comparing the weight of fully water-swollen resin beads after various centrifugation cycles using a laboratory centrifuge capable of 2,500 rpm. The anion exchange capacity (AEC) was determined by measuring the total exchangeable anions that a specific amount of resin can adsorb as milliequivalents per weight (meq/g) or volume (meq/mL).

TABLE 1

| | | Example No. | |
| --- | --- | --- | --- |
| Test | 4% DVB copolymer | 1 | 3 |
| S/R (microscope) | 1.00 | 0.73 | 0.54 |
| S/R (wt. cap.) | 1.00 | 0.47 | 0.39 |
| S/R (vol. cap.) | 1.00 | 0.61 | 0.51 |
| Appearance (% C-P-M) | 99.2-0.3-0.5 | 99.6-0-0.4 | 97.1-1.2-1.7 |
| Density (g/mL) | 0.723 | 0.714 | 0.707 |
| Mean size (µm) | 666 | 676 | 638 |
| Uniformity coefficient | 1.43 | 1.36 | 1.24 |
| % Moisture | 56.0 | 50.9 | 48.2 |
| AEC (meq/g) | 4.09 | 3.49 | 3.14 |
| AEC (meq/mL) | 1.30 | 1.22 | 1.15 |

Figure 3:
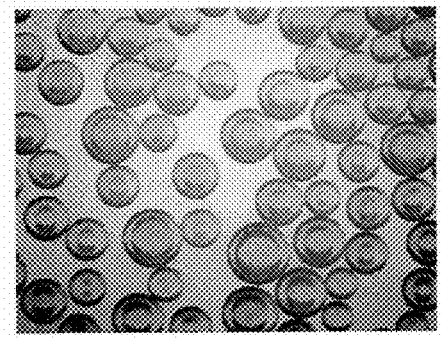
FIG. 3 is a microscope image showing the functionalized copolymer obtained in Example 3. The functionalized beads contain distinct shell and core regions.

FIG. 3 is an image of the functionalized copolymer obtained in Example 3. A border between the inert core and functionalized shell is shown. In FIG. 3, the bead diameter is approximately 500 microns.

Example 4

A monomer phase containing styrene (760 g), divinylbenzene 80% (40 g), and tert-butylperoxo-2-ethylhexanoate (3.2 g) was filtered over a polytetrafluoroethylene filter (0.2 µm) and added to a reactor equipped with an agitator. An aqueous phase containing deionized water (1000 mL), polyvinylalcohol (Mowiol® 40-88) (10 g), and sodium nitrite (0.05 g) was then added to the reactor, and the reaction mixture was heated to 78° C. and maintained for 4.5 hours. The temperature was then increased to 90° C. for 1 hour. The copolymer beads contained about 4.0% cross-linked divinylbenzene based on the total copolymer weight.

A solution of paraformaldehyde (112 g), methanol (156 mL), ethylene dichloride (100 mL) and 40% iron (III) chloride (15 mL) was added to a 1 L reactor. Chlorosulfonic acid (220 mL) was added slowly to the suspension at a temperature below 38° C. The reactor was then cooled to 20° C., and a 150 g portion of the copolymer beads (4% DVB gel, fraction 250-630 µm copolymer) was added. The mixture was stirred at 30° C. for 4 hours. Methanol (300 mL) was slowly added to the suspension at a temperature of 20-22° C. to quench the reaction. The chloromethylated beads were then washed over a glass filter with methanol (3×500 mL), acetone (3×500 mL) and water (3×500 mL).

The chloromethylated beads were then charged with water (400 mL) in a 1 L reactor and stirred for 10 minutes at room temperature. 50% trimethylamine (180 mL) was added to the mixture and the suspension was incubated for 3 hours at 44° C. The reaction was cooled to 20-25° C. and concentrated HCl was added to acidify the suspension. The aminated resin was rinsed with water until acid free. The reaction yield was 630 mL of isolated resin having a swelling factor of 4.20 and an S/R ratio of 0.66. The properties of the isolated beads are shown in Table 2.

TABLE 2

| Test | Example No. 4 |
| --- | --- |
| % Optical aspect | 98 |
| % Moisture | 41.9 |
| AEC (meq/g) | 3.16 |
| AEC (meq/mL) | 1.33 |

Example 5

A monomer phase containing styrene (760 g), divinylbenzene 80% (40 g), and tert-butylperoxo-2-ethylhexanoate (3.2 g) was filtered over a polytetrafluoroethylene filter (0.2 µm) and added to a reactor equipped with an agitator. An aqueous phase containing deionized water (1000 mL), polyvinylalcohol (Mowiol® 40-88) (10 g), and sodium nitrite (0.05 g) was then added to the reactor, and the reaction mixture was heated to 78° C. and maintained for 4.5 hours. The temperature was then increased to 90° C. for 1 hour. The copolymer beads contain about 4.0% cross-linked divinylbenzene based on the total copolymer weight.

A solution of paraformaldehyde (112 g), methanol (156 mL), ethylene dichloride (100 mL) and 40% iron (III) chloride (15 mL) was added to a 1 L reactor. Chlorosulfonic acid (220 mL) was added slowly to the suspension at a temperature below 38° C. The reactor was then cooled to 20° C., and a 150 g portion of the copolymer beads (4% DVB gel, fraction 250-630 µm copolymer) was added. The mixture was stirred at 30° C. for 4 hours. Methanol (300 mL) was slowly added to the suspension at a temperature of 20-22° C. to quench the reaction. The chloromethylated beads were then washed over a glass filter with methanol (3×500 mL), acetone (3×500 mL) and water (3×500 mL).

The chloromethylated beads were then charged with water (400 mL) in a 1 L reactor and stirred for 10 minutes at room temperature. Trimethylamine 50% (140 mL) was added to the mixture and the suspension was incubated for 24 hours at 44° C. The reaction was cooled to 20-25° C. and concentrated HCl was added to acidify the suspension. The aminated resin was rinsed with water until acid free. The reaction yield was 595 mL isolated resin having a swelling factor of 3.95 and an S/R ratio of 0.57.

Example 6

Gel core/shell resin beads were prepared as described in Example 4. The amination reaction was performed at 44° C. for 4-6 hours. The optimal reaction time was determined by monitoring the S/R ratio by microscope analysis until the desired S/R ratio was obtained. The properties of the isolated beads are shown in Table 3. The optical aspect values in Table 3 reflect the percent of perfect beads in the resin sample as determined by analysis on a stereo microscope with magnification between 20× and 40×. Moisture retention values represent water retention capacity of resin bead samples in chloride form.

TABLE 3

Functionalized 4% DVB Anion Resins of Example 6

| S/R Ratio | Optical Aspect (%) | Moisture Retention(%) | AEC (eq/kg) | AEC (eq/L) |
| --- | --- | --- | --- | --- |
| 1.0 | 100 | 50.3 | 3.78 | 1.33 |
| 0.86 | 97 | 48.4 | 3.60 | 1.33 |
| 0.59 | 98 | 41.9 | 3.16 | 1.33 |

Figure 4:
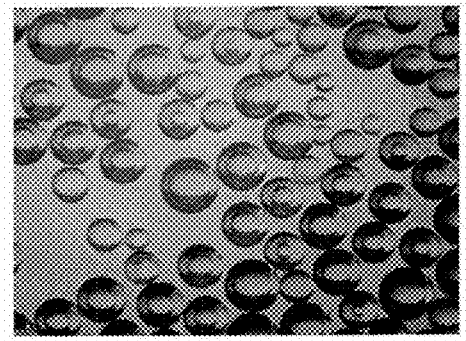
FIG. 4 is a microscope image showing the functionalized copolymer beads obtained in Example 6. The beads shown in the image have an average S/R ratio of 0.59.

FIG. 4 is an image of the functionalized copolymer beads obtained in Example 6. As shown, the resin beads in FIG. 4 exhibit an S/R ratio of 0.59. A border between chloromethylated core and functionalized shell is shown. The bead diameter is approximately 500 microns.

Figure 5:
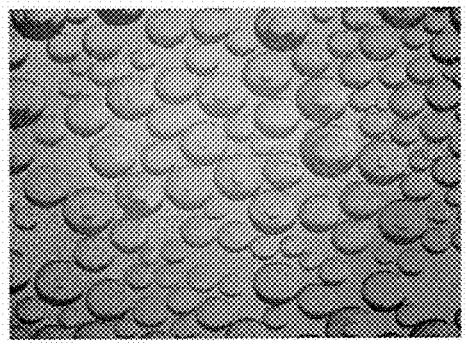
FIG. 5 is a microscope image showing the functionalized copolymer beads obtained in Example 6. The beads shown in the image have an average S/R ratio of 0.86.

FIG. 5 is an image of the functionalized copolymer beads obtained in Example 6. As shown, the resin beads in FIG. 5 exhibit an S/R ratio of 0.86. A border between the chloromethylated core and the functionalized shell is shown. The bead diameter is approximately 500 microns.

Example 7

In Example 7, an aminated resin of the invention containing an S/R ratio of 0.63 (TMA Core Resin) was prepared according to the procedure set forth in Example 1. A standard core resin (STD Anion Resin) with an S/R ratio of 1.00 was also prepared as a comparison sample. The TMA Core resin and the STD Core Resin differ with respect to their S/R ratio, but are otherwise identical.

Figure 6:
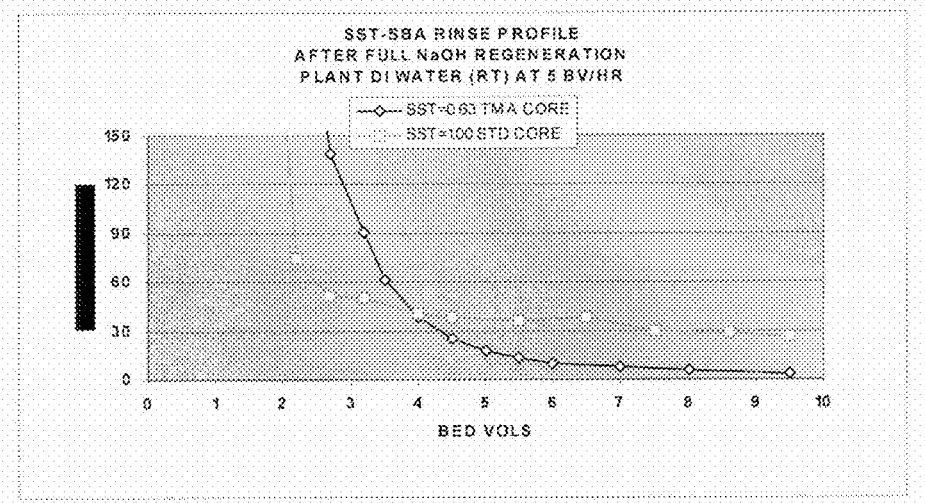
FIG. 6 depicts the rinse profile of the aminated resin prepared in Example 7 and a standard core resin comparison sample.

In this example, the rinse profile of the resins were measured by flushing the resins with sodium hydroxide and then measuring the conductivity released upon treatment with deionized water at a rate of 5 bed volumes (BV) per hour. The rinse profile of the TMS Core Resin and the STD Core Resin, are each shown in FIG. 6. As illustrated, the TMS Core Resin achieves a low conductivity (indicative of low leakage of sodium ions) which is substantially lower than the conductivity measured for the STD Core Resin. Accordingly, the TMS Core Resin of the invention exhibits improved properties, including low leakage of sodium ions. The TMS Core resin of the invention also exhibits low leakage of silica and fulvic acid, as shown in Table 4 below.

TABLE 4

Comparative Performance Runs for 4% Anion Exchange Resins

| Flow Cycle | Resin | NaOH (lb/ft$^3$) | Capacity (meq/mL) | % Fulvic Acid Leakage | % SiO$_2$ Leakage |
| --- | --- | --- | --- | --- | --- |
| 1 | TMA Core | 6 | 0.48 | 23 | 8 |
|   | STD Core | 6 | 0.48 | 19 | 8 |
| 2 | TMA Core | 3 | 0.27 | 5 | 4 |
|   | STD Core | 3 | 0.24 | 11 | 4 |
| 3 | TMA Core | 3 | 0.34 | 0.4 | 3 |
|   | STD Core | 3 | 0.37 | 15 | 4 |
| 4 | TMA Core | 3 | 0.31 | 3 | 3 |
|   | STD Core | 3 | 0.29 | 12 | 4 |
| 5 | TMA Core | 3 | 0.28 | 0 | 2 |
|   | STD Core | 3 | 0.30 | 7 | 4 |

Example 8

In Example 8, an aminated resin of the invention containing an S/R ratio of 0.56 was prepared according to the procedure set forth in Example 1. A standard core resin with an S/R ratio of 1.00 was also prepared as a comparison sample. The resin of the invention and the standard differ with respect to their S/R ratio, but are otherwise identical.

In this experiment, the resins were washed with 60 bed volumes of methanol and were then tested to determine levels of total dissolved carbon (TOC). As shown in Table 5 below, the core/shell resin of the invention exhibits low and improved TOC levels as compared to standard resins.

TABLE 5

Comparative TOC Tests

| S/R Ratio | TOC (ppb) |
| --- | --- |
| 1.0 | 3106 |
| 0.56 | 596 |

The invention claimed is:
1. Anion exchange resin in bead form, comprising:
aminated functional groups; and
a matrix of a cross-linked polymer containing a core area and a shell area,
wherein the concentration of aminated functional groups is lower in the core area relative to the shell area.
2. The anion exchange resin according to claim 1, wherein the core area is substantially free of aminated functional groups.
3. The anion exchange resin according to claim 1, wherein a ratio of the shell area radius to the bead radius is below 0.8.
4. The anion exchange resin according to claim 1, wherein a ratio of the shell area radius to bead radius is in the range of 0.6 to 0.8.
5. The anion exchange resin according to claim 1, wherein the aminated functional groups are derived from secondary and tertiary amines.

6. The anion exchange resin according to claim 5, wherein the aminated functional groups are derived from triethylamine.

7. A process for preparing the anion exchange resin beads according to claim 1 comprising the steps of:
   providing cross-linked chloromethylated copolymer intermediate resin beads, the bead containing a core area and a shell area, the core area being substantially free of chloromethyl functional groups; and
   aminating the chloromethylated copolymer intermediate resin beads to form an aminated anion exchange resin in which the core area is substantially free of aminated functional groups.

8. The process according to claim 7, wherein the anion exchange resin beads have a ratio of shell radius to bead radius of below 0.80.

9. The process according to claim 7, wherein the anion exchange resin beads have a ratio of shell radius to bead radius is in the range of 0.6 to 0.8.

10. The process according to claim 7, wherein the chloromethylated copolymer intermediate is prepared by reacting a chloromethylating agent with a copolymer in the presence of a catalyst and an acid.

11. The process according to claim 10, wherein the copolymer comprises a vinyl polymer.

12. The process according to claim 10, wherein the copolymer is a styrene-divinylbenzene copolymer.

13. The process according to claim 10, wherein the copolymer is made from multiple vinyl monomers.

14. The process according to claim 10, wherein the catalyst is iron (III) chloride.

15. The process according to claim 10, wherein the acid is sulfuric acid.

16. The process according to claim 10, wherein the copolymer is a styrene-divinylbenzene copolymer, the catalyst is iron (III) chloride, and the acid is sulfuric acid.

17. The process according to claim 10, wherein the reaction is carried out at a temperature of about 15° C. for about 4 hours.

18. The process according to claim 10, wherein the reaction is carried out in the absence of any additional solvent.

19. The process according to claim 18, wherein the solvent is the chloromethylating agent.

20. The process according to claim 10, wherein the ratio of chloromethylating agent to co-polymer is in the range of about 2 to about 20.

21. The process according to claim 20, wherein the ratio of chloromethylating agent to co-polymer is in the range of about 4 to 9.

22. The process according to claim 10, wherein the chloromethylating agent is prepared in situ.

23. A process for preparing the anion exchange resin beads according to claim 1, comprising the steps of:
   providing cross-linked chloromethylated copolymer intermediate resin beads; and
   aminating the chloromethylated copolymer intermediate to form aminated resin beads containing a core area and a shell area,
wherein the concentration of aminated functional groups is lower in the core area relative to the shell area.

24. The process according to claim 23, wherein the amination reaction is carried out in the absence of an organic solvent.

25. The process according to claim 24, wherein the amination reaction is carried out in water without organic solvent.

26. The process according to claim 23, wherein a ratio of shell area radius to bead radius is below 0.8.

27. The process according to claim 23, wherein a ratio of shell area radius to bead radius is in the range of 0.6 to 0.8.

28. The process according to claim 23, wherein the aminated functional groups are derived from secondary and tertiary amines.

29. The process according to claim 28, wherein the aminated functional groups are derived from triethylamine.

30. The anion exchange resin according to claim 1, wherein the polymer is a styrene-divinylbenzene copolymer.

* * * * *